Nov. 11, 1941.  W. E. HUFFMAN ET AL  2,262,003
HEATER, AUTOMOTIVE AND AIRCRAFT
Filed June 27, 1941  2 Sheets-Sheet 2
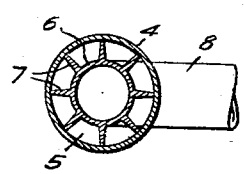
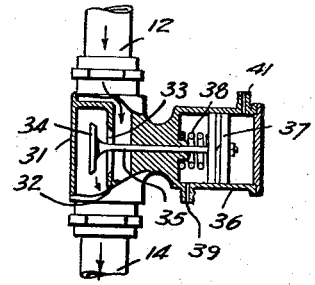
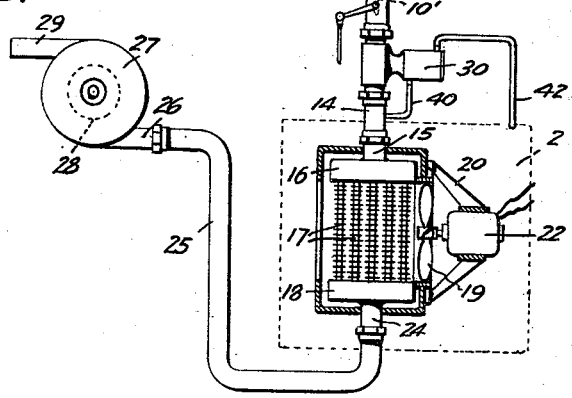
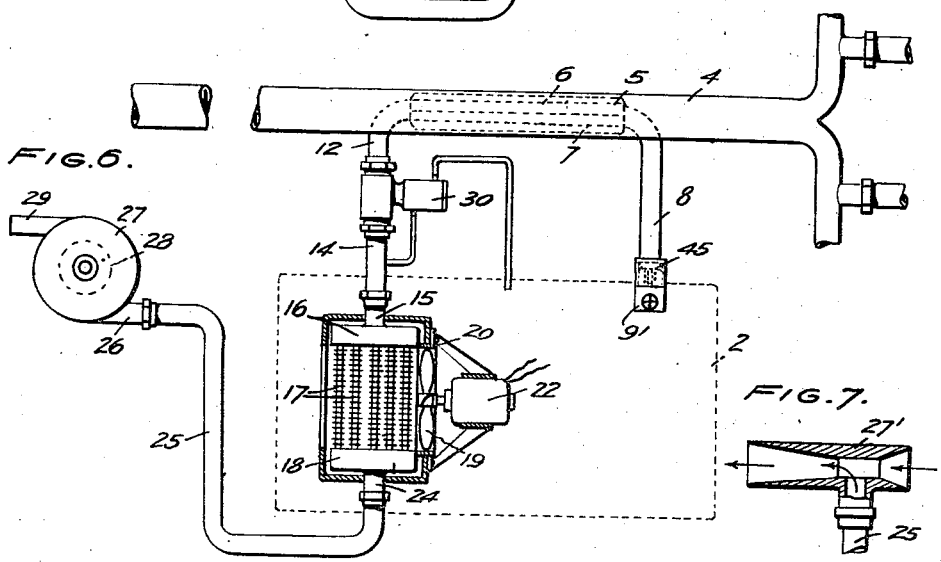
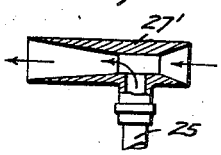
INVENTORS
WILLIAM E. HUFFMAN
OTTO MORGENSEN, JR.
ATTORNEYS Patented Nov. 11, 1941

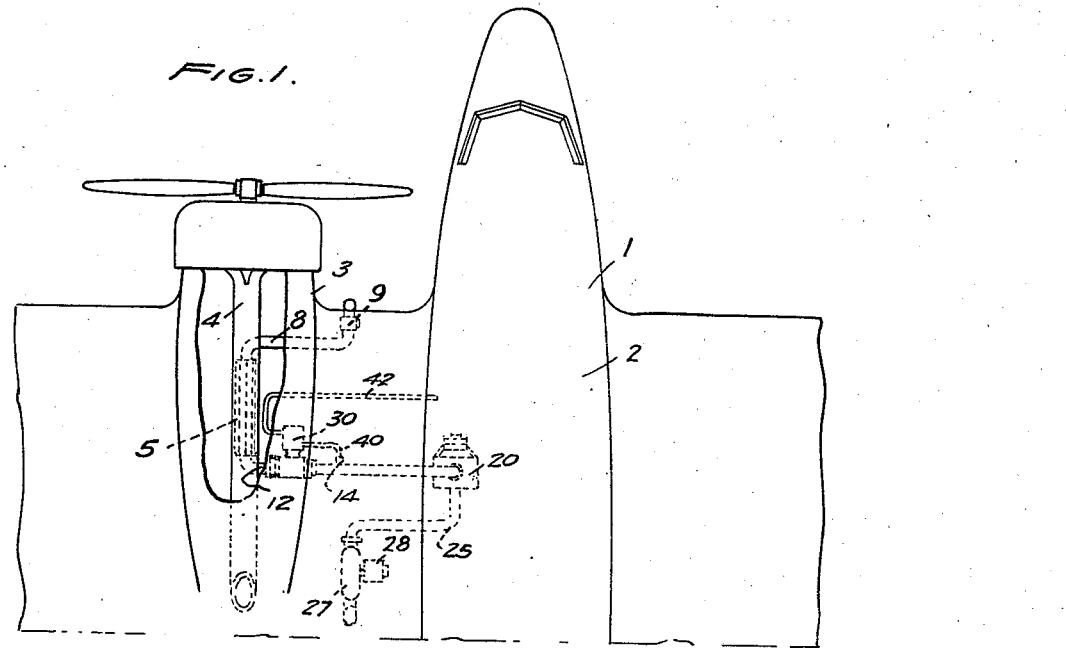
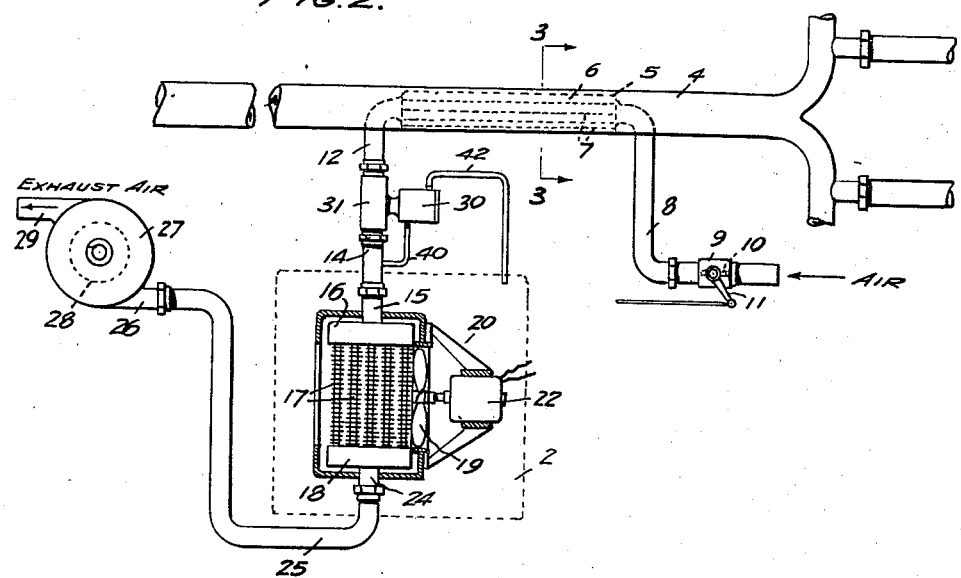

2,262,003

UNITED STATES PATENT OFFICE 2,262,003

HEATER, AUTOMOTIVE AND AIRCRAFT

William E. Huffman and Otto Morgensen, Jr., Dayton, Ohio

Application June 27, 1941, Serial No. 400,056

10 Claims. (Cl. 237—2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a heating system adapted for use either in automobiles or aircraft and is particularly well suited for use in the latter.

Cabin heaters are essential in modern aircraft, either commercial or military, which are required to fly at high altitudes, or operate in cold weather, and such aircraft have generally employed vapor heating systems including a boiler associated with the exhaust manifold of the engine to receive heat therefrom, and delivering steam under pressure to radiators mounted within the cabin, the water vapor discharged from the radiators being condensed in suitable air-cooled condensers and returned to the boiler, or boilers, for recirculation. Vapor heating systems of this character have given a great deal of trouble from the service standpoint due to the fact that water is the only safe heat-transfer medium which can be employed, and when the aircraft is on the ground for a protracted period of time during cold weather without the engines running, the water in the heating systems will freeze unless drained therefrom, and hence has resulted in bursting pipes and the like when the ground crews have failed to remove the water from the heating system. Vapor heating systems also have the disadvantage of greatly added weight which is very undesirable in aircraft installations.

Heating systems employing air heated by the engine exhaust gases as a heat-transfer medium, or using exhaust gases from the engine directly as a heating medium have many advantages from a service and weight standpoint over vapor heating systems, but suffer from the disadvantage that carbon monoxide from the exhaust gases is liable to escape from the heating system into the cabin of the aircraft, or into the closed body of an automobile as the case might be and thereby cause the death of the occupants. Such hot-air heating systems, though formerly employed in the automotive field, have practically disappeared in later years due to the dangers of carbon-monoxide poisoning, despite their inherent advantages from the standpoint of simplicity of construction and reliability in operation.

The present invention employs air heated by the exhaust manifold of the engine, or a portion of the exhaust gases directly as a heat-transfer medium to heat the interior of an automotive vehicle or an aircraft cabin, and overcomes the difficulties encountered in previous heating systems of this character by employing positive safeguards against any possible contamination of the air within the vehicle from carbon monoxide or other poisonous gases present in the engine exhaust system. In accordance with the present invention the possibility of leakage of carbon monoxide from the engine exhaust system into the heating system, or from the heating system into the vehicle interior, is prevented by maintaining the absolute pressure within those portions of the heating system located in the aircraft cabin, or the like, at a value less than the pressure existing within the aircraft or vehicle inclosure. By this provision if any leak occurs in the heating system which would tend to permit the entrance of poisonous gases from the heating system into the cabin inclosure, the greater pressure of the air within the cabin tends to cause leakage flow in a reverse direction, that is the leakage will occur from the cabin interior into the heating system so that poisonous gases in the latter are prevented from entering the vehicle inclosure to be heated. The pressure within those portions of the heating system lying within the inclosed vehicle space to be heated is maintained at an absolute value less than the pressure existing within the inclosure to be heated, by means of a suction blower connected to the discharge conduit of the heating system, and the flow of heated air or exhaust gases passing through the heating system is controlled by a pressure-responsive valve so that the pressure within the fore-mentioned portion of the heating system within the space to be heated is always maintained less than the cabin pressure, and the control valve is always operative to cut off all flow through the heating system in the event of any serious leakage within the portion of the heating system in contact with the air in the vehicle inclosure.

It is therefore an object of this invention to provide a heating system for automotive vehicles in which air acting as a heat transfer is passed in heat exchange relation to the engine exhaust gases, or the engine exhaust gases themselves are utilized as a heat-transfer medium to transfer heat to a heat exchanger mounted within the interior of the vehicle, the pressure of the air or exhaust gases within that portion of the heating system in contact with the air within the vehicle inclosure being maintained at an absolute pressure less than the pressure within the said portion of the heating system mounted within the vehicle inclosure.

It is a further object of the invention to provide a heating system for automotive vehicles, including aircraft, comprising, in combination with a heat exchanger mounted within the vehicle inclosure, of means for passing a heat-transfer medium deriving its heat from the engine exhaust gases therethrough, and of means for discharging the heat-transfer medium from said heat exchanger to the outside atmosphere, of means for creating a pressure difference across said heat exchanger to cause a flow of said heat-transfer medium therethrough, and an automatic pressure-responsive control valve operative to maintain the pressure within said heat exchanger and adjacent parts of the connecting conduits at an absolute value less than the pressure existing within the space to be heated.

Other objects of the invention not specifically enumerated above will become apparent by reference to the detailed description in the specification and to the appended drawings, in which:

Fig. 1 is a diagrammatic view illustrating the installation of a heating system in accordance with the invention for heating the cabin of an aircraft or other vehicles;

Fig. 2 is a diagrammatic view illustrating the principal components of one form of heating system in accordance with the invention;

Fig. 3 is a sectional view taken on line 3—3 of Fig. 2, and illustrating the construction of a heat exchanger mounted within the engine exhaust manifold;

Fig. 4 is a view partly in section illustrating the details of a pressure-responsive control valve illustrated in Fig. 2 and employed in the various modifications of the invention;

Fig. 5 is a diagrammatic view illustrating a modified form of the invention in which the exhaust gases are directly employed as a heat-transfer medium;

Fig. 6 is a diagrammatic view of a further modification of the invention similar to the device illustrated in Figs. 1 and 2, but differing therefrom in that air from within the space to be heated is employed as a heat-transfer medium.

Fig. 7 is a sectional view of a Venturi tube vacuum pump which may be employed to replace the suction blower in the various forms of the invention.

Referring now to Fig. 1, the reference numeral 1 generally indicates an aircraft, for example, of the bi-motor type, having a cabin interior 2 which it is desired to heat. As illustrated, the aircraft is provided with engine nacelles 3, one of which is shown, within which is mounted a suitable propelling engine (not shown) provided with an exhaust manifold 4, within which is mounted a heat exchanger 5 arranged to receive heat from the exhaust gases passed thereover. The heat exchanger 5 is connected by means of an inlet conduit 8 to the outside atmosphere to receive a supply of air therefrom under the control of an inlet gate valve 9. The heat exchanger 5 is provided with an outlet conduit 12 which is communicatively connected through the medium of an automatic-pressure responsive control valve 30 to the inlet conduit 14 of a heat exchanger 20 mounted within the interior of the aircraft cabin 2, the heat exchanger being provided with a discharge conduit 25 which is connected to a small motor-driven suction blower 27 which causes the discharge of the exhaust-transfer medium to the atmosphere.

The heating system assembly illustrated in Fig. 1 and shown in detail in Fig. 2 will now be specifically described. As noted in Fig. 2, the heat exchanger 5 comprises a tubular member 6 arranged coaxially within the main exhaust conduit 4, and is provided with exterior fins 7 (Fig. 3) extending longitudinally within the manifold 4 and adapted to absorb heat from the exhaust gases passing thereover, and thereby heat air passing through the heat exchanger conduit 6. The heat exchanger 5, as previously noted, is connected to an air inlet conduit 8 which communicates with the outside atmosphere, and is provided with a gate-valve assembly 9, including a butterfly valve 10, controlled by means of an arm 11 which may be actuated by any suitable manual control from within the vehicle. By means of the gate valve 9 the quantity of air passing through the heating system may be regulated, and hence the temperature within the vehicle space to be heated may be controlled at the will of the operator. The heat exchanger 5 is provided with an outlet conduit 12 which is connected through the medium of an automatic pressure control valve generally indicated at 30 to a conduit 14 which is connected to the inlet 15 of the upper header 16 of a second heat exchanger or radiator of well-known type and generally indicated by the reference numeral 20. A plurality of the finned tubes 17 arranged in parallel connect the upper header 16 to a similar lower header 18, and heat from the air passing through the tube 17 is transmitted to the interior of the cabin 2 by means of a blower fan 19 arranged to circulate the air from the cabin interior over the heat exchanger tubes 17, the fan 19 being driven by an electric motor 22 energized by a power source such as a battery or generator carried by the vehicle. The lower header 18 is provided with an outlet connection 24 from which the discharge heat-transfer medium may pass into a discharge conduit 25. The discharge conduit 25 is connected to the inlet 26 of a small centrifugal suction blower adapted to be driven, for example, by an electric motor 28, and exhausting heated air, or other transfer medium through a discharge outlet 29 to the outside atmosphere.

The suction blower 27 may be replaced by means of a Venturi tube 27' (Fig. 7) placed in the propeller air stream and such a suction producing means is to be considered as a full equivalent of the power-driven pump 27 as illustrated in the drawing.

The pressure-responsive control valve 30 as previously noted, is inserted between the conduits 12 and 14 and, as seen in Fig. 4, comprises a housing 31, having a partition wall 32 formed therein, the wall being provided with a port 33. A poppet valve 34 is arranged to cooperate with a valve seat formed by the edges of the port 33 so that when the valve lifts from its seat gas may flow from the heat exchanger 5 to the heat exchanger 20 (Fig. 2) through the port, and when the valve is closed all flow of gases through the heating system is prevented. The poppet valve 34 is provided with the valve stem 35 which extends within a cylinder 36, the latter being integrally formed with the valve casing 31. The cylinder 36 is closed at its outer end and has a piston 37 slidably mounted therein which is secured to the outer end of the valve stem 35, the piston being urged in an outward direction by means of a light coil spring 38 which tends to urge the poppet valve 34 in the closing direction.

The cylinder 36 is provided at its inner end with a passage 39 which is adapted to be communicatively connected with one end of the conduit 40 (Fig. 2), the other end of which is connected to the interior of the conduit 14 to transmit the pressure from within the conduit 14 and heat exchanger 20 to the inner side of the piston 37. The cylinder 36 is also provided with a passage 41 adapted to be communicatively connected by means of a conduit 42 (Fig. 2) with the interior of the cabin space 2 of the vehicle, which space is to be heated by the heat exchanger 20, so that the instant pressure within the cabin 2 will be transmitted to the cylinder 36 to act on the outer side of the piston 37. It is thus seen that the poppet valve 34 will assume a position with respect to its valve seat determined by the difference in pressure acting on opposite sides of the piston 37 and the valve is operative so that it will lift from its seat to allow flow through the heating system only when the pressure acting on the outer face of the piston, due to the pressure existing within the cabin 2, exceeds the pressure acting on the inner face of the piston 37 due to the pressure existing within the conduit 14 or heat exchanger 20, plus the small loading of the valve due to the spring 38. Under all conditions of operation in order that the valve 34 be opened, it is necessary that the pressure within the cabin 2 exceed the pressure existing within the conduit 14 and the heat exchanger 20, and, as long as this condition prevails, any leak within the heat exchanger 20 and its connecting conduits exposed to the air within the cabin 2, will allow the air from within the cabin to escape into the heating system, but will not allow a counter flow of the heat-transfer medium from within the conduit 14 or heat exchanger 20 to leak into the cabin inclosure. In the event that a leak, due to rusting or the like within those parts of the heating system contained within the aircraft cabin, of such a magnitude as to cause a serious decrease in the vacuum existing within the said parts of the heating system, the differential in pressure on the opposite sides of the pistons 37 of the control valve 30 will be insufficient to maintain the valve 34 in its open position and the spring 38 (Fig. 4) will urge the valve to the closed position and cut off all flow through the heating system and positively isolate the heat exchanger 20 from flow connection with the heat exchanger 5, and thus definitely prevent the possibility of any exhaust gases reaching the interior of the aircraft cabin, or vehicle inclosure as the case might be. The control of the flow of air through the heating system to thereby regulate the quantity of heat passing to the interior of the cabin 2 is as previously noted controlled by means of the gate valve unit 9.

It is thus seen that by means of the gate valve control for the heat exchanger 5, the temperature within the space to be heated may be regulated; and by means of the automatic control valve 30 responsive to the difference in pressure between the inside of the cabin 2 and the pressure within the conduit 14 and heat exchanger 20, the pressure within the heat exchanger is continuously maintained at an absolute value less than the pressure existing within the cabin inclosure, and thereby preventing leakage of combustion products into the vehicle; and by means of the loading spring 38 of the valve 30 (Fig. 4), in the event of any serious leakage within the portion of the heating system contained within the aircraft cabin, the heat exchanger 20 will be isolated from the remaining portions of the heating system and all flow of the heat-transfer medium through the heat exchanger 20 will be prevented, thus rendering the heating system inoperative upon the occurrence of a dangerous leak.

The heating system illustrated in Fig. 5 is similar in all respects to the system disclosed in Figs. 1 and 2, with the exception that a portion of the exhaust gases taken from the main exhaust conduit 4 are conducted through a branch conduit 4' into the conduit 12 to serve directly as a heat-transfer medium in place of the use of air taken from the outside atmosphere as in the system of Fig. 2. A butterfly valve 10' is employed to manually control the quantity flow of exhaust products into the heating system to thus regulate the temperature within the cabin 2 and serving the same purpose as the gate valve 9 of the system of Fig. 2. The operation of the system of Fig. 5 is otherwise identical with that of the system of Fig. 2 and need not be further described. The control valve 30 functions in exactly the same manner as heretofore described.

The heating system illustrated in Fig. 6 is similar in all respects to the heating system illustrated in Fig. 2, with the exception that the inlet conduit 8 is connected to the interior of the cabin 2 which is to be heated and thus the air serving as a heat-transfer medium is obtained from the air within the cabin 2, the cabin being supplied with fresh air through any suitable source (not shown). A manually controlled gate valve 9' is used to regulate the quantity of air flowing from the cabin 2 into the heating system in the same manner as the valve 9 is employed in the system of Fig. 2, and an automatic spring-loaded check valve 45 is inserted into the conduit 8 beyond the valve 9' and serves to automatically cut off the heating system from communication with the interior of the cabin 2 upon the occurrence of any leakage within the conduit 14 or heat exchanger 20 of a sufficient magnitude to allow the automatic pressure-control valve 30 to close, as described above with reference to the device of Fig. 2, thus preventing any counter flow of heat-transfer medium from the heat exchanger 5 back through the inlet conduit 8 to the interior of the cabin 2. The operation of the system of Fig. 6 is otherwise identical with that as above described with reference to the heating system of Fig. 2.

It is, of course, to be understood that the heat exchanger 5, (Figs. 1, 2 and 6) need not necessarily be placed within the exhaust conduit, but may also be made in the form of an annular housing surrounding a portion of the exhaust conduit in a manner well known in the art; and in heating systems for automobiles and the like where the pressure within the portion of the vehicle to be heated is not subject to an appreciable change, the differential pressure-responsive control valve may be replaced by a simple spring-loaded check valve, the spring loading of which is made such that the valve will only be open when the pressure within the conduit 14 and the heat exchanger 20 is less than the pressure existing within the vehicle inclosure to be heated, to thereby control the heating system in the same manner as above described with reference to the differential pressure-responsive valve.

While preferred embodiments of the invention have been disclosed, it is obvious that various changes may be made therein, for example, in the character of the differential pressure-responsive control valve and other elements of the respective heating systems, without departing from the scope of the invention as defined by the appended claims.

We claim:

1. A heating system for internal-combustion-engine-propelled vehicles comprising, a first heat exchanger adapted to transfer heat from the engine exhaust gases to air serving as a heat-transfer medium and having an air inlet, a second heat exchanger mounted within the vehicle space to be heated, a conduit connecting said first and said second heat exchangers for transmission of the heat-transfer medium therebetween, a discharge conduit connecting said second heat exchanger and the atmosphere, suction producing means associated with said discharge conduit for causing a flow of the heat-transfer medium through said heating system, and valve means positioned in the conduit connecting said heat exchangers operative to maintain the absolute pressure of the heat-transfer medium within the second heat exchanger at a value less than the pressure within the vehicle space to be heated.

2. The structure as claimed in claim 1, in which said valve means is responsive to the difference in pressure between the pressure within the second heat exchanger and the pressure within the vehicle space to be heated and operative to permit flow of the heat-transfer medium through the heating system only when the absolute pressure within the vehicle space to be heated exceeds the absolute pressure within the second heat exchanger.

3. The structure as claimed in claim 1, in which the air inlet to said first heat exchanger is communicatively connected to the interior of the vehicle space to be heated so that the air serving as a heat-transfer medium is taken from the space to be heated, and a check valve for controlling the air flow from the space to be heated to said heat exchanger inlet and operative to permit flow only when the absolute pressure within the heating system is less than the absolute pressure within the said space to be heated.

4. A heating system for heating the passenger inclosure of an internal-combustion-engine-propelled vehicle comprising, a heat exchanger mounted within the said inclosure for heating the air inclosed therein, an inlet conduit for said heat exchanger for conveying a gaseous heat-transfer medium thereto having a temperature substantially equal to the temperature of the engine exhaust gases, a discharge conduit connected to said heat exchanger and communicating with the atmosphere exterior of said inclosure, said discharge conduit having operatively associated therewith a suction producing means for causing a flow of said heat-transfer medium through said heat exchanger, and pressure-responsive valve means in said inlet conduit operative to permit flow of heat transfer medium through the heating system only when the pressure within the said passenger inclosure exceeds the pressure within the heat exchanger and connected conduits within said inclosure to thereby prevent the leakage of poisonous gases into the said passenger inclosure.

5. The structure as claimed in claim 4, including a second heat exchanger operatively connected to said inlet conduit and adapted to receive heat from the engine exhaust gases to thereby transfer heat to the heat-transfer medium and an inlet connection between said second heat exchanger and the atmosphere whereby air passing through said second heat exchanger is employed as the heat-transfer medium.

6. The structure as claimed in claim 4, in which said inlet conduit is connected to the engine exhaust manifold to thereby utilize exhaust gases as a heat-transfer medium.

7. The structure as claimed in claim 4, in which said inlet conduit communicates with the said passenger inclosure to receive air therefrom, a check valve in said conduit operative to permit flow of air from said inclosure through said conduit only when the pressure within said inclosure exceeds the pressure within said conduit beyond said valve, and a portion of said inlet conduit being arranged in heat exchange relation with the exhaust gases from the engine.

8. A vehicle heating system utilizing internal-combustion engine-exhaust gases as a source of heat, comprising a heat exchanger arranged within the vehicle space to be heated, a conduit communicating at one end with the atmosphere exterior of said vehicle space and connected at its other end with said heat exchanger, a portion of said conduit being arranged in heat exchange relation with the exhaust gases of the engine, a discharge conduit connected to said heat exchanger, a vacuum pump connected to said discharge conduit for causing a flow of heated air through the heating system, and a differential pressure-responsive valve in said first named conduit between the said portion thereof in heat exchange relation with the engine exhaust gases and said heat exchanger and operative in response to a decrease in the absolute pressure within said heat exchanger and the portions of the associated inlet and discharge conduits within the vehicle space to be heated below the pressure existing within the space to be heated to allow the flow of heated air through the heating system.

9. The structure as claimed in claim 8, in which manually actuated valve means are located in said first named conduit adjacent the point of communication thereof with the atmosphere and operative to control the flow of air into the heating system.

10. In a heating system for heating the passenger inclosure of an internal-combustion-engine-propelled vehicle, an engine exhaust conduit, a heat exchanger mounted within the said vehicle inclosure, an inlet conduit connected at one end to said heat exchanger and at its other end to said exhaust conduit to receive exhaust gases therefrom, a discharge conduit connected at one end to said heat exchanger and at its other end to a vacuum pumping means, a manually controlled valve adjacent the exhaust gas entrance of said inlet conduit to control the quantity of exhaust gases admitted thereto, a differential pressure-responsive valve means located in said inlet conduit between said manually actuated valve and said heat exchanger and exterior of said vehicle inclosure, said valve means being operative upon the occurrence of a predetermined difference in the absolute pressure between the portion of said heating system between said differential pressure-responsive valve and said vacuum pumping means and the pressure within said vehicle inclosure to open and allow a flow of exhaust gases through the heating system.

WILLIAM E. HUFFMAN.
OTTO MORGENSEN, JR.